United States Patent [19]

Wu

[11] Patent Number: 5,590,536
[45] Date of Patent: Jan. 7, 1997

[54] BYPASS CRYOGENIC CURRENT LEADS EMPLOYING HIGH TEMPERATURE SUPERCONDUCTORS

[75] Inventor: Jiing-Liang Wu, Murrysville Borough, Pa.

[73] Assignee: Northrop Grumman Corp., Century City, Calif.

[21] Appl. No.: 420,994

[22] Filed: Apr. 13, 1995

[51] Int. Cl.$^6$ .................................................. F25B 19/00
[52] U.S. Cl. ........................... 62/51.1; 505/220; 505/706; 505/888
[58] Field of Search ............................. 62/51.1; 505/220, 505/706, 888

[56] References Cited

U.S. PATENT DOCUMENTS

| | | | |
|---|---|---|---|
| 4,291,541 | 9/1981 | Kneip, Jr. et al. | 62/51.1 |
| 4,369,636 | 1/1983 | Purcell et al. | 62/51.1 X |
| 4,841,268 | 6/1989 | Burnett et al. | 62/51.1 X |
| 4,872,322 | 10/1989 | Woods et al. | 62/51.1 |
| 5,166,776 | 11/1992 | Dederer et al. | 62/51.1 |
| 5,260,266 | 11/1993 | Herd et al. | 62/51.1 X |
| 5,396,206 | 3/1995 | Herd et al. | 62/51.1 X |
| 5,412,363 | 5/1995 | Breneman et al. | 62/51.1 X |

OTHER PUBLICATIONS

"Design And Tsting Of A High Temperature Superconducting Current Lead," by J. L. Wu, J. T. Dederer, P. W. Eckels, S. K. Singh, J. R. Hull, R. B. Poeppel, C. A. Youngdahl, J. P. Singh, M. T. Lanagan and U. Balachandran, 1990 Applied Superconductivity Conference, Snowmans Village, Colorado, Sep. 24–28, 1990.

"Materials; What are the Prospects?", by Shoji Tanaka, IEEE Transactions on Magnetics, vol. 27, No. 2, Mar., 1991.

*Primary Examiner*—Christopher Kilner
*Attorney, Agent, or Firm*—C. O. Edwards

[57] ABSTRACT

A cryogenic bypass current lead to bypass quenched magnets in a string of magnets in a superconducting super collider comprises a HTSC section interposed between a lower conductive body terminal and the conductive of the lead is described.

8 Claims, 4 Drawing Sheets

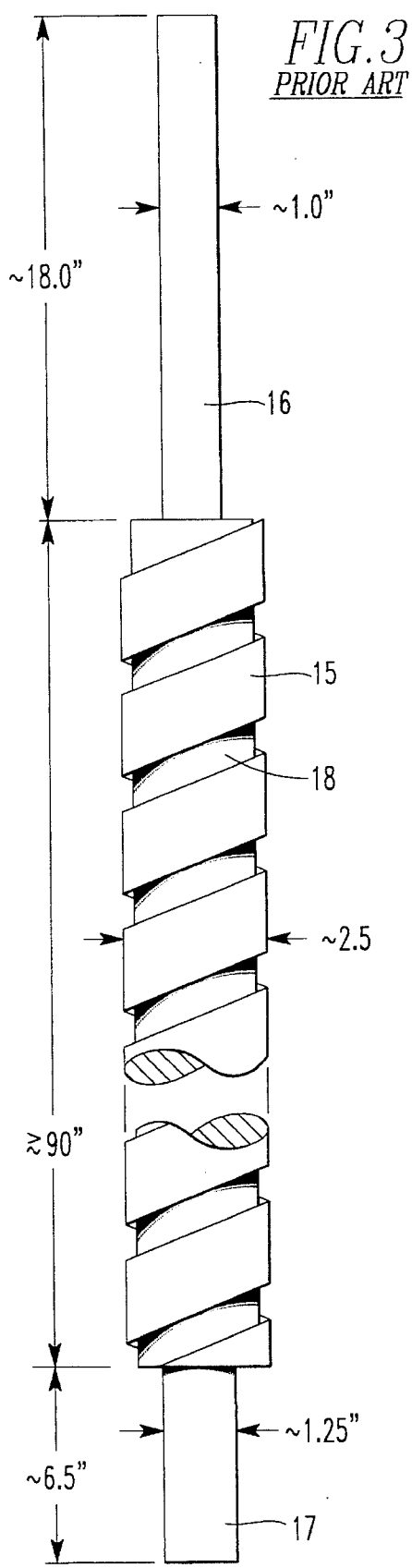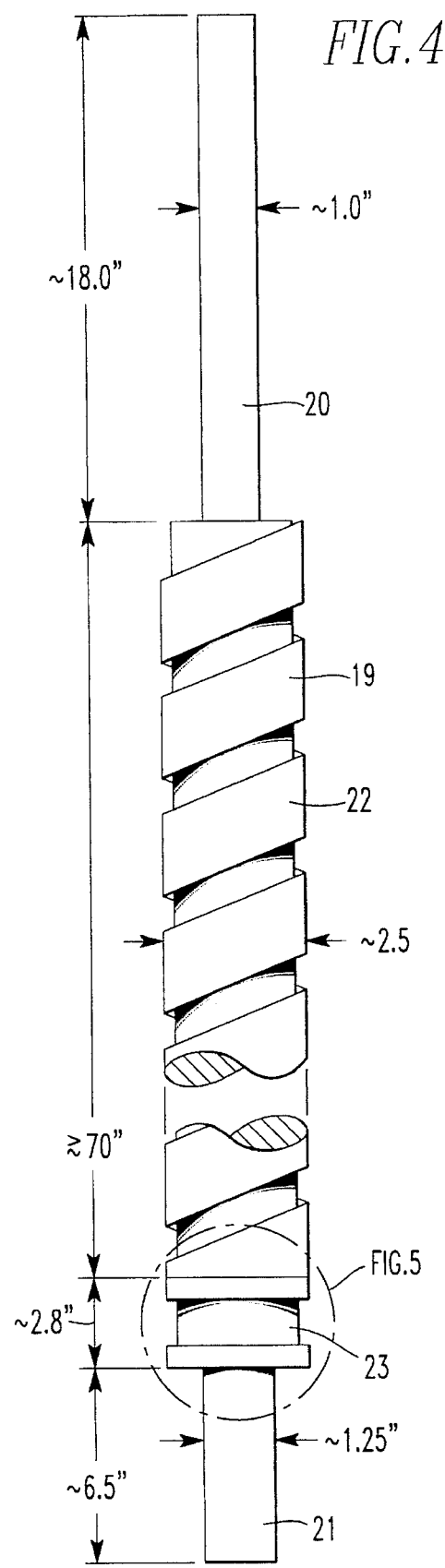

BYPASS CRYOGENIC CURRENT LEADS EMPLOYING HIGH TEMPERATURE SUPERCONDUCTORS

BACKGROUND OF THE INVENTION

1. Field of the Invention

This invention relates to bypass cryogenic leads. More particularly, it relates to such power leads incorporation high temperature, ceramic superconductors.

2. Background Information

A bypass current lead as employed for example in the spools of a Superconducting Super Collider (SSC), provides a paralleled current pass for current to bypass the quenched magnets and to follow through the unquenched string of magnets. This allows the energy in the quenched and the unquenched magnets to be dissipated with a different time constant-faster dissipation in the quenched magnets and slower dissipation in the unquenched ones-and therefore enhances the reliability and prolongs the useful life of the magnet. The bypass lead carries current only during a short period, following a magnet quench till the energy in the magnets is completely dissipated. In the SSC, the current pulse to the bypass leads rises to about 7 kA in several seconds and then decays to zero with an L/R time constant of about 30 seconds. The bypass leads are required to have a minimal heat leak under normal conditions when it carries no current, be ready at all times to permit very high magnitude of current flow in the event of a quench, and be ready for operation again within a short time (30 minutes in the case of SSC) following completion of a quench protection cycle. Separate flow rate control valves, small flow rate for normal operating conditions and large flow rate following a magnet quench, are available for controlling the cooling helium flow rate through the bypass lead. FIG. 1 shows the bypass lead and the cold mass of the spool pieces used in the collider ring of the SSC known as SPXA/SPRA spools.

In order to minimize the heat leak, a conventional bypass current lead, as illustrated in FIG. 2, employs stainless steel in its entire operating length, and uses copper only in the upper and the lower terminal regions, as shown schematically in FIG. 3. In carrying current following a magnet quench, Joule heating in the stainless steel part of the lead will increase significantly the local lead conductor temperatures. In order to prevent this temperature rise from causing a quench in the superconducting power bus which carries current to the unquenched string of magnets, a quench stopper is installed between the bypass lead lower terminal and the superconducting power bus. The quench stopper (13), as shown in FIG. 1, consists essentially of a big thermal mass, has complicated design feature for heat transfer consideration and is expensive to fabricate. In addition, low heat leak condition also requires that the bypass lead conductor length be sufficiently long and therefore needs to be wrapped a few times around the cold mass of the spools. This creates difficulties in lead design and spool component assembly.

There remains a need to eliminate the need of the quench stopper, to shorten the length of the bypass lead such that no wrapping around the cold mass is necessary and to reduce heat leak in normal conditions by employing ceramic high temperature superconductor in the bypass lead.

BRIEF DESCRIPTION OF THE PRIOR ART

The conventional bypass current lead conductor, shown schematically in FIG. 3, consists of a main stainless steel section and upper and lower terminals made of copper.

It was estimated that, under normal conditions, this conventional bypass lead design has a thermal impedance of approximately 92 K/W and requires a helium flow rate of approximately 2.1 mg/s to cool it. Following a magnet quench, the temperature rise at the low terminal region could reach 90 K as a result of carrying the bypass current. To cool the lead back to the normal operating condition within 30 minutes, the helium flow rate needs to be increased to at least 200 mg/s.

Wu et al describes the design and testing of a high temperature superconduction current lead in which the high critical temperature and low thermal conductivity of the ceramic superconductor Y—Ba—Cu—O were utilized to reduce the Joule heating and the heat leak in a vapor-cooled current lead design of nominally 1-kA capacity, in a paper presented in the 1990 Applied Superconductivity Conference, Sep. 24–28, 1990 at Snowmans Village Colo. IEEE Trans Mag. Vol 27, No.2, March 1991.

U.S. Pat. No. 5,166,776 to Westinghouse discloses a power lead for a cryostat has high temperature superconducting (HTSC) conductors extending inward toward a pool of liquid cryogen in the cryostat in series with normal conductors extending from HTSC conductors to outside the cryostat.

SUMMARY OF THE INVENTION

A primary object of the present invention is to eliminate the mechanically complicated component i.e. the quench stopper in the quench protection systems of superconducting magnets in particle accelerators.

Another object of the present invention, is to shorten the length of the bypass current lead thereby simplifying its fabrication and installation.

Yet another object of the present invention, is to reduce heat leak of the bypass lead.

Broadly speaking, the foregoing objects are satisfied by a bypass current lead employing ceramic high temperature superconductor. Typically, as shown for example in FIG. 4 which will be described below, the upper and the lower terminals of the lead remain the same as the conventional design while the length of the stainless section (S.S.) has been reduced. A high temperature superconductor (HTSC) is added between the low end of the S.S. section and the upper end of the lower lead terminal.

DESCRIPTION OF THE FIGURES

A full understanding of the invention can be gained from the following description of the preferred embodiments when read in conjunction with the accompanying drawings in which:

FIG. 3 is a schematic of a conventional bypass lead conductor depicting typical dimensions.

FIG. 4 is a longitudinal sectional view of a bypass cryogenic current incorporation high temperature superconductors in accordance with this invention.

DESCRIPTION OF THE PREFERRED EMBODIMENTS

Figure 1:
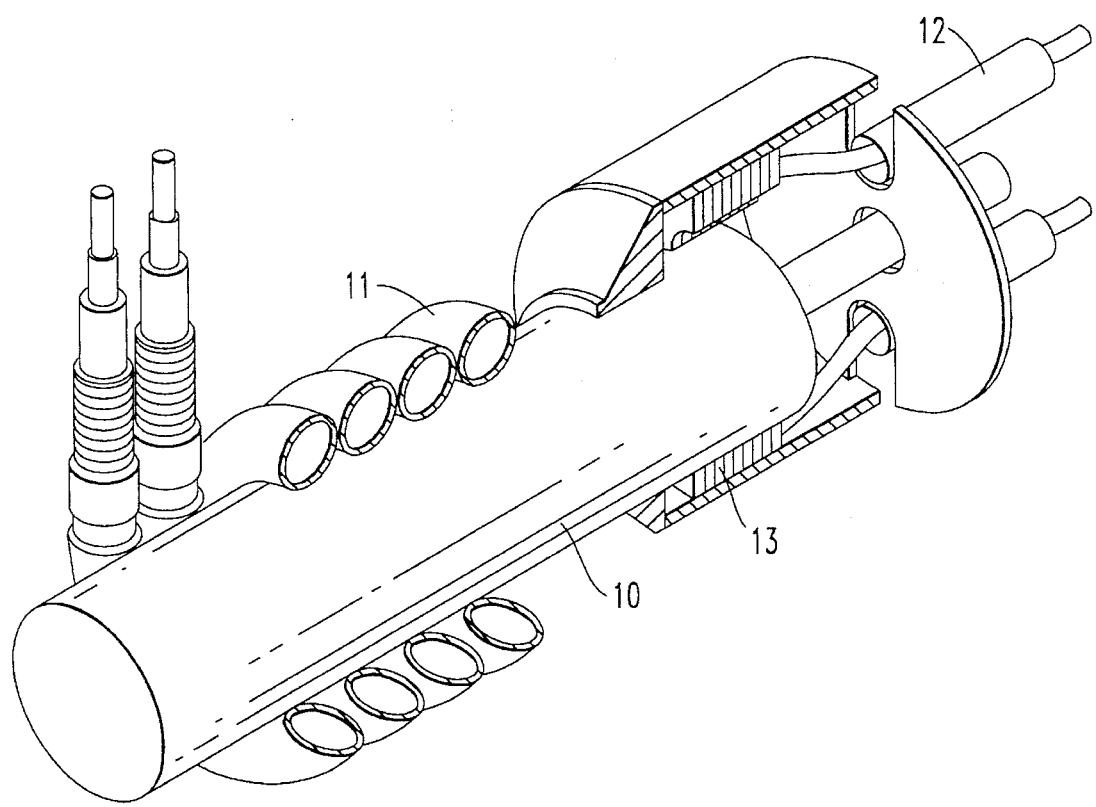
FIG. 1 is a vertical sectional view, illustrating a conventional bypass lead and the cold mass of SCC spool.
Figure 2:
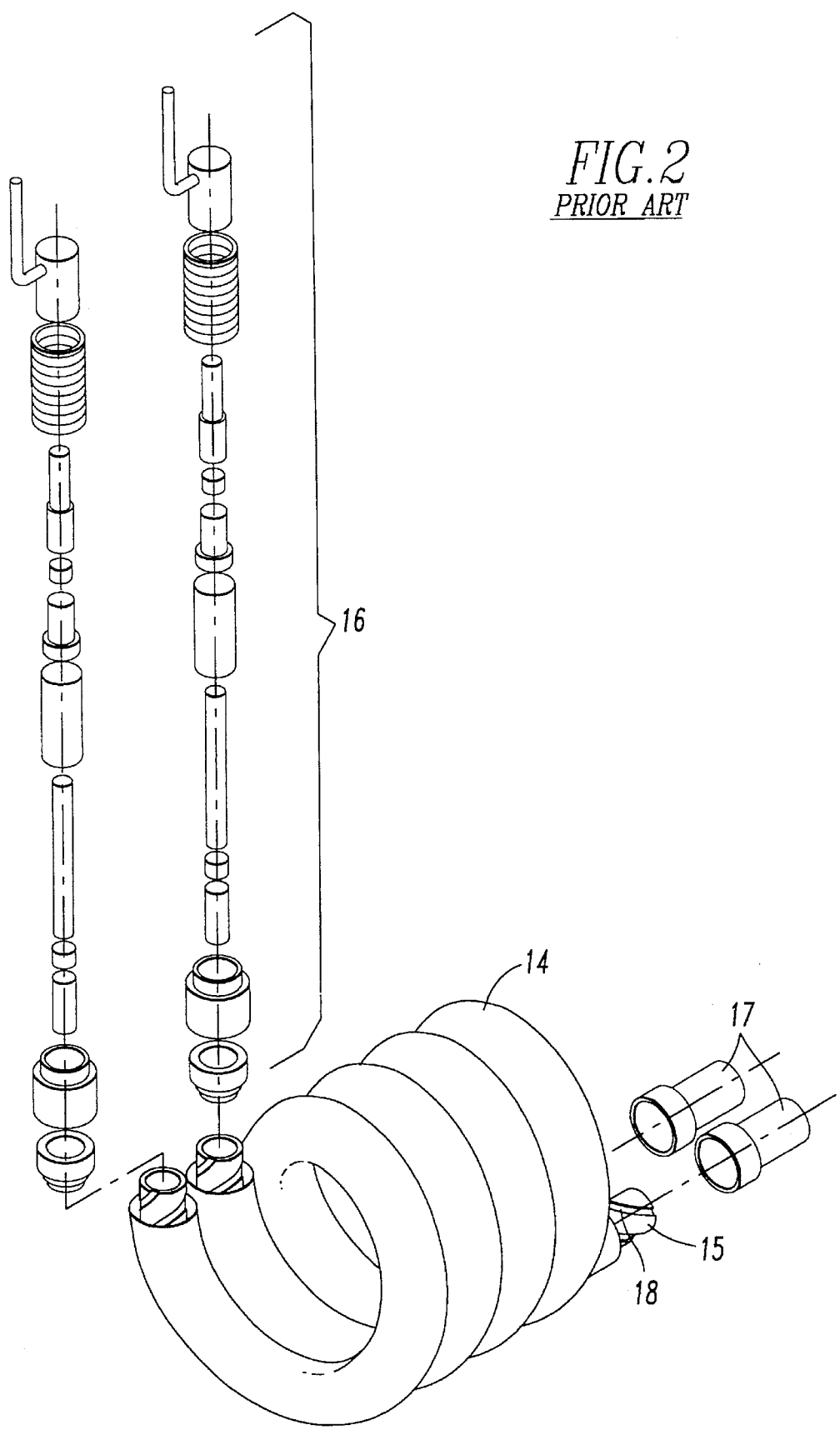
FIG. 2 is an exploded view of the bypass lead as shown in FIG. 1.

Turning to FIG. 1, it illustrates a conventional bypass lead as employed in a SSC. In order to prevent the temperature rise (as described herein above) from causing a quench in the superconducting power bus (12) which carries current to the unquenched string of magnets, a quench stopper (13) is installed between the lower terminal of bypass lead (11) and the superconducting power bus (12). The bypass lead (11), as shown in FIG. 2, employs a stainless steel jacket (14) enclosing a stainless steel conductor (15) with flow channels (18) in its entire operation length and uses copper in the upper terminal (16) as well in the lower terminal (17). FIG. 3 is a schematic of the bypass lead conductor showing the stainless steel conductor (15) and cooling channels (18) and upper and lower terminals (16) and (17) respectively.

In operation, the lower terminal (17) interfaces with the cold mass of the spool and is connected to the quench stopper (13), which in turn is connected to the main superconducting power bus (12). The upper terminal (16) is connected to the current supply source. Helical vapor flow channels (18) are optionally machined onto the outer surface of the stainless steel body (15) and the outer surface of the S.S. body (15) is wrapped with insulating material such as Kapton insulation sheets. The flow channels (18) enhance heat transfer between the gaseous helium and the S.S. body (15). The outer stainless steel jacket (14) serves as an enclosure and conduit of the bypass lead. Examples of appropriate dimensions of the lead (11) are shown in FIG. 3. The length of the lead (11) necessitates that the bypass lead (11) be wrapped around the spool cold mass (10) a few turns before it interfaces into the cold mass interior, as illustrated in FIG. 1.

Turning now to the FIG. 4, a bypass lead (19) having upper and lower terminals (20) and (21) is depicted. The upper and lower terminals (20) and (21) employs copper as in the prior art while the stainless steel body (22) remains the same as described in the prior art. However, it is shortened typically by about twenty inches than the prior art stainless steel section.

A HTSC section (23) according to the present invention is embedded between the stainless steel body (22) and the upper end of the second or lower terminal (21).

In a typical construction, the HTSC section, including its terminal, has a length of approximately 2.8 inches. Therefore, the overall length of the lead is approximately 17 inches shorter than the conventional design. Similar helical cooling channels (18) as described earlier can be optionally machined onto the S.S. body for heat transfer enhancement.

Figure 5:
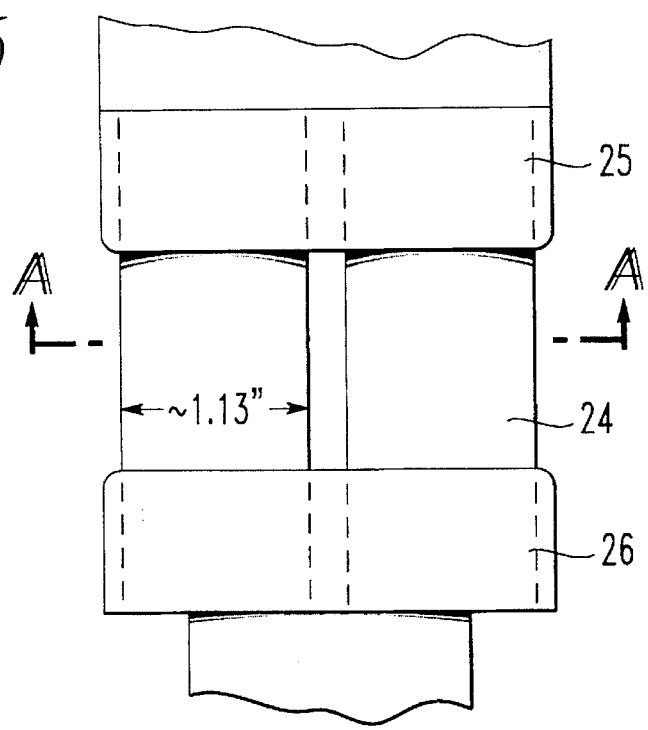
FIG. 5 is an exploded view of the HTSC section.
Figure 6:
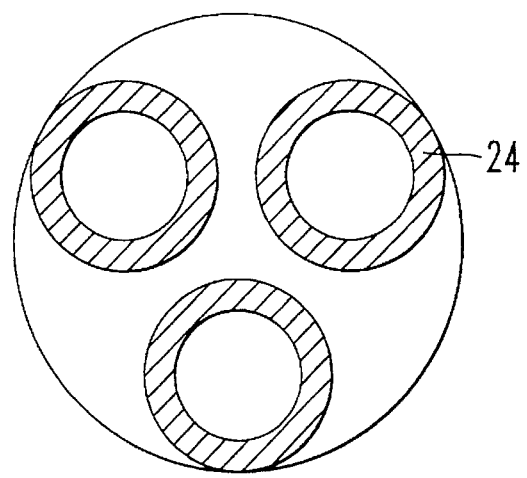
FIG. 6 is a X-section of the HTSC section taken along the lines A—A of FIG. 5.

The HTSC section, shown in more detail in FIG. 5, consists of multiple monolithic high temperature superconductors connected in parallel to achieve high current capacity. A suitable design example may employ three tubular type ceramic superconductors (24), each having a cross-sectional area of approximately 5 cm$^2$ (1.125" O.D., 0.528" I.D.), and a length of approximately 2.8 inches. The two ends of these tubular ceramic superconductors (24) are wrapped with silver sheets (not shown) or coated with silver to facilitate soldering, with low contact joint resistance, to the upper and lower copper terminals (25) and (26). Cooling gas helium can be made to flow over the outer surface of the HTSC tubes or through the inside of the tubes. HTSC materials are newly developed materials having a critical temperature (below which they are superconducting) which is substantially above the near absolute zero critical temperature for conventional superconducting materials. HTSC materials include many ceramic materials. See for example U.S. Pat. No. 5,166,776. Ceramic high temperature superconductors, such as Y—Ba—Cu—O(YBCO), Bi—Sr—Ca—Cu—O(BSCCO) and Tl—Ba—Ca—Cu—O(TBCCO) systems, are suitable materials for the HTSC tubes. The dimensions of HTSC tubes shown in FIG. 6 are the preferred design when BSCCO-2212 is used. Variation of the dimensions may be required for other type of HTSC materials to account for the difference of thermal and electrical properties. It is expected that top terminal of the HTSC will be maintained at a temperature of no higher than 50 K in normal condition and when carrying current following a magnetic quench, and the lower terminal will have temperature of about 4.5 K.

Analysis shows that the bypass current lead, employing the high temperature superconductors and having a geometry as shown in FIG. 5, has a thermal impedance of about 10% higher than the conventional design and therefore requires a lower helium flow rate for cooling, 1.9 mg/s vs. 2.1 mg/s for conventional design. It has also been shown through analysis that following a magnet quench, the Joule heating generated in the stainless steel section of the lead can be sufficiently cooled by the increased helium vapor flow and that the thermal conductivity of the ceramic superconductor material is sufficiently low, that no appreciable heat is conducted through the high temperature superconductor toward the lower lead terminal. Combining this effect with no Joule heating in the superconductor and very low Joule heating in the lower HTSC terminal (as a result of low contact joint resistance), it is expected that the temperature rise at the lower lead terminal during and following a magnet quench will not exceed 2 K. This temperature rise is sufficiently small that quench in the bus is not expected even without the presence of a quench stopper. The increased helium vapor flow can also maintain the entire HTSC at a low enough temperature that no quench in the HTSC is expected.

I claim:

1. A cryogenic bypass current lead providing a parallel magnet current pass for current to bypass the quenched magnets in a string of magnets in a superconducting super collider and exhibiting reduced heat escape associated with the bypass current lead during normal operating conduction which comprises:

a. a conducting body of a first thermal conductivity and having an upper end and a lower end;

b. an upper conductor terminal coupled with the upper end of the conducting body;

c. a high temperature superconductor section coupled with the lower end of the conducting body; and d. a lower conductor terminal coupled with the high temperature superconductor section;

the upper conductor terminal and the lower conductor terminal each having a second thermal conductivity higher than the first thermal conductivity of the conducting body.

2. A bypass lead as defined in claim 1 in which said upper conductor terminal comprises copper.

3. A bypass lead as defined in claim 1 in which said lower terminal comprises copper.

4. A bypass lead as defined in claim 1 in which said conducting body comprises stainless steel.

5. A bypass lead as defined in claim 4 wherein said conducting body comprises flow channels to facilitate vapor passage.

6. A bypass lead as defined in claim 1 wherein said light temperature super conductor section comprises 3 tubular members.

7. A bypass lead as defined in claim 6 wherein said tubular members are connected in parallel to achieve high current capacity.

8. A bypass lead as defined in claim 1 wherein said high temperature super conductive section comprises a member selected from the group consisting of Y—Ba—Cu—O (YBCO), Bi—Sr—Ca—Cu—O (BSSCO), and Tl—Ba—Ca—Cu—O (TBCCO ).

* * * * *